United States Patent
Reddy

[15] 3,635,499
[45] Jan. 18, 1972

[54] LIP SEAL

[72] Inventor: Robert R. Reddy, 1195 Michillinda Blvd., Pasadena, Calif. 91107

[22] Filed: Feb. 24, 1969

[21] Appl. No.: 801,664

[52] U.S. Cl. ..................285/111, 277/180, 277/206, 285/332.3, 285/334.5
[51] Int. Cl. .................................................F16l 17/00
[58] Field of Search ..................285/110, 111, 332.3, 334.5; 277/180, 205, 206, 236

[56] References Cited

UNITED STATES PATENTS

| | | | |
|---|---|---|---|
| 2,131,552 | 9/1938 | Delin | 285/332.3 |
| 3,258,279 | 6/1966 | Johnsen | 285/110 |
| 3,315,970 | 4/1967 | Holloway | 285/111 X |

FOREIGN PATENTS OR APPLICATIONS

| | | | |
|---|---|---|---|
| 444,769 | 5/1927 | Germany | 285/111 |
| 417,637 | 10/1934 | Great Britain | 285/110 |

Primary Examiner—Dave W. Arola
Attorney—Angus & Mon

[57] ABSTRACT

A lip seal for making a gastight seal between two abutting surfaces. A peripheral groove is formed in one of the abutting surfaces and has a bearing surface facing toward the direction of positive differential fluid flow. A backing lip surface forms a reentrant lip between the bearing surface and the respective abutment surface, and a relief surface joins the bearing surface to the abutment surface. A ring seal has a pair of legs joined by a central bight, one of the legs and the bight having a surface which matches and bears against the bearing surface and the backing lip surface, the other leg carrying a sealing surface and projecting beyond the groove so as to make a deflectible and fluidtight resilient seal with the opposite abutment surface.

3 Claims, 5 Drawing Figures

PATENTED JAN 18 1972
3,635,499
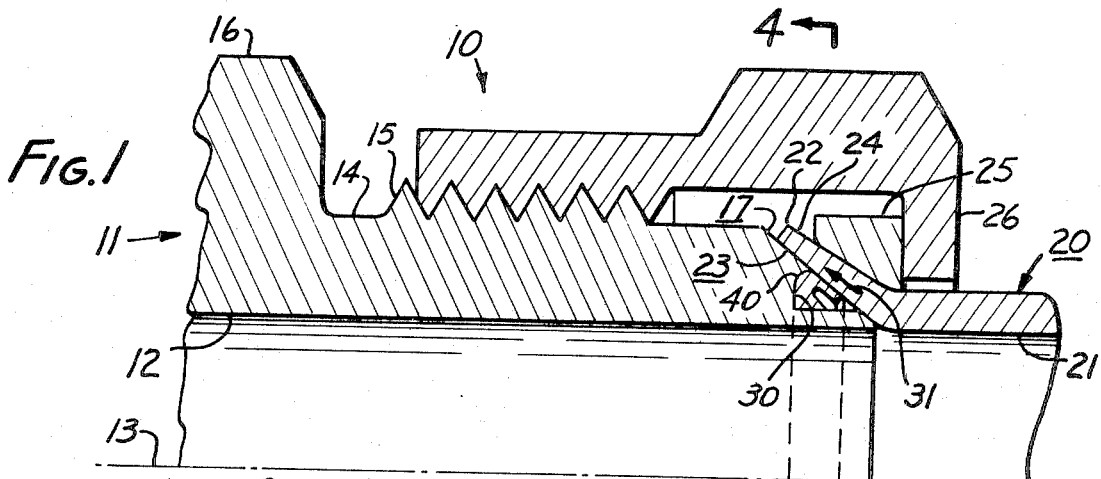
FIG. 1
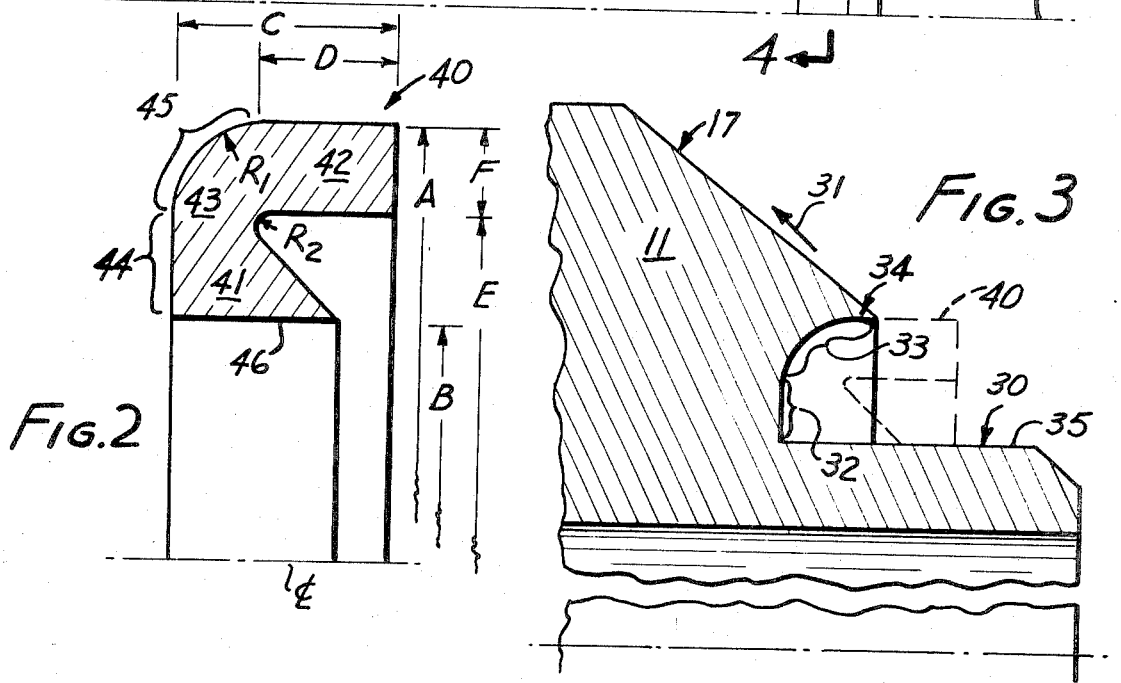
FIG. 2
FIG. 3
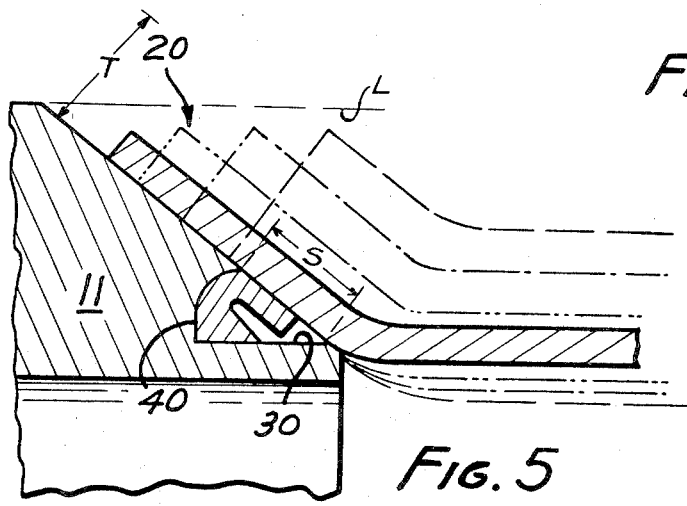
FIG. 5
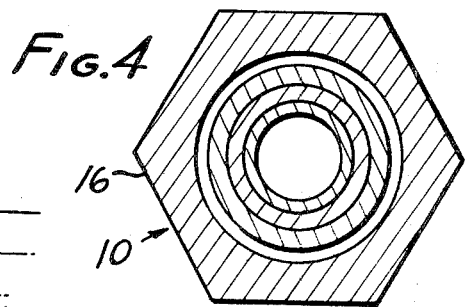
FIG. 4
INVENTOR.
ROBERT R. REDDY
BY Angus & Mon
ATTORNEYS.

LIP SEAL

This invention relates to a lip seal for making fluidtight seals between two abutting surfaces.

Sealing devices between two abutting abutment surfaces are generally well known. The common aircraft "B" nut is a well-known example in which a threaded body with an end bearing an abutment surface is held against a flared abutment surface on an adjoining body by a nut which surrounds the flare and engages the threads on the threaded body. It is customary to provide a ring groove on one of the abutment surfaces and to place a sealing ring therein. There are numerous problems with such sealing rings, principally occasioned by the deforming and extruding forces, and the wide range of temperatures to which they are subjected. Many rings will take a permanent set and lose their resilient nature, while others will be deformed by the forces so as not to exert a reliable sealing effect around the entire periphery.

It is an object of this invention to provide a seal structure, and a sealing ring which in the structure is firmly backed and supported against deformation by fluid forces which it is to resist. An object of the invention is to maintain the ring in its shape as a body of revolution so that a continuous contact is made with the abutting surfaces against which it bears. The success of this endeavor has been shown by tests wherein the device of this invention seals against liquid helium at cryogenic temperatures even when the nut is only fingertight. The seal has been found to be effective in the temperature range between $-420°$ and $+500°$ F. Such a result is not obtainable with the known art.

A seal structure according to the present invention includes a pair of bodies which enclose a flow conduit which is to be sealed from its surroundings. The bodies bear respective abutment surfaces which match and are intended to be drawn against each other, and between which there is a direction of positive flow, namely from a higher to a lower of two pressures. In one of the abutment surfaces there is formed a peripheral ring groove which is formed with a bearing surface that faces toward the direction of positive flow. The bearing surface is joined to its respective abutment surface by a backing lip surface which extends toward the direction of forward flow, thereby to form a reentrant backing lip. The other edge of the bearing surface is joined to the respective abutment surface by a relief surface.

A sealing ring is placed in the ring groove, and this ring comprises a pair of legs joined by a central bight. This sealing ring is made of a resilient, substantially incompressible material such as Teflon. It has a pair of legs and a central bight, one of which legs and the bight have a surface conforming to those of the bearing surface and the backing lip surface. The other leg is a sealing leg which in its undistorted condition extends beyond its respective abutment surface. In a preferred embodiment of the invention, the leg which stands within the ring groove also has a foot which bears against the relief surface further to reduce distortion when differential pressure is exerted.

When the abutment surfaces are drawn together, the sealing leg bears against the opposed abutment surface, and is pressed into the groove by it. The springback force of the ring causes a seal to be formed with the opposed abutment surface. The backing lip prevents distortion of the ring, and it also provides substantial additional mechanical support which increases the mechanical area and reliability of the device.

The backing lip increases the mechanical area of support on the ring without requiring an increase in depth of the ring groove, and it has been found that a wider range of thickness of tubings can be sealed with a single sealing structure than has heretofore been possible, because the ring groove need take up less linear length along the abutment surfaces than in prior devices.

The above and other features of this invention will be fully understood from the following detailed description and the accompanying drawings of which:

FIG. 1 is an axial half section of the presently preferred embodiment of the invention, shown in its fluid-sealing, assembled condition;

FIG. 2 is an axial half section of a portion of FIG. 1 in its relaxed and undistorted condition;

FIG. 3 is an enlarged axial half section of a portion of the device of FIG. 1;

FIG. 4 is a cross section taken at line 4—4 of FIG. 1;

FIG. 5 is an axial half section of a portion of FIG. 1 showing an advantage of the invention.

FIG. 1 shows a seal structure tin of the class known in the trade as a "B" nut assembly. This assembly includes a first body 11 having a central bore 12 for a fluid passageway along a central axis 13. This body has a nose 14 with a reduced diameter, and an external thread 15 on it. A hexagonal array of wrench-engaging surfaces 16 is formed on this body. The body further has an abutment surface 17 which is frustoconical.

A second body 20 in this device is a tube having a central bore 21 coaxial on axis 13. This tube has a flare 22 which is formed on its end, and the flare has an abutment surface 23 which is also preferably the frustum of a cone which matches and conforms to abutment surface 17.

The back side of the flare has a support surface 24 against which a ring 25 is brought to bear by a nut 26 which threads on to thread 15 of the first body, in this way holding the abutment surfaces against each other, and the seal structure assembled.

Abutment surface 17 includes a ring groove 30 (FIG. 3) which is formed in the surface thereof. It is formed peripherally, and it will be understood that the abutment surfaces, the ring groove, and the ring yet to be described are all surfaces of revolution coaxial on axis 13. This ring groove is in its respective abutment surface, and has for its purpose to seal against a direction of positive flow 31, which in this case is assumed to be from a higher pressure inside the passage to a lower pressure outside the passage. It will be understood that the assembly yet to be described could be reversed in direction so as to face and to seal against a flow in the opposite direction when the outside of the structure is at the higher pressure such as might occur in an undersea application, for example.

The ring groove includes a bearing surface 32 which faces toward the direction of positive flow. It will ordinarily make an angle relative thereto, in this case approximately 45°, and will extend part way to the abutment surface but will not reach that surface. Between the bearing surface and the intersection of the groove with the abutment surface 17 there is formed a backing lip surface 33. It curves toward the direction of positive flow, and forms a reentrant lip 34 which extends toward the direction of positive flow. A relief surface 35 joins the other edge of the bearing surface to abutment surface 17. It may be a cylindrical surface, if desired, or may be shaped arbitrarily.

A sealing ring 40 is placed in the ring groove. This ring, which is shown in its relaxed condition in FIG. 2, comprises a unitary structure of resilient, substantially incompressible material. A preferred embodiment of the material is one of the fluorinated hydrocarbons, suitable examples being Teflon or Kel-F, these being preferred because of their resistance to a wide range of temperatures. The sealing ring has a bearing leg 41, a sealing leg 42, and a central bight 43. On the back side of the seal there is a bearing surface 44 adapted to bear against bearing surface 32, and a backing surface 45 adapted to bear against backing lip surface 33. These surfaces are substantially congruent to each other, and the backing surface terminates at approximately the end of the reentrant lip. It will thereby be seen from FIG. 3, where the sealing ring is shown in dashed line without contact with an opposing abutment surface, that the bearing leg and bight are in firm continuous contact with the bearing surface and the backing lip surface, respectively, and that the sealing lip will project out of the ring groove as shown. The ring can be deformed into the ring groove by contact with the opposing abutment surface, and this is shown in FIG. 1. It will be noted that when installed the ring's deformation is essentially that of a bending at the bight.

In the preferred embodiment shown, a foot 46 is formed on the bearing leg extending toward the abutment surfaces and in firm contact with the relief surface for purposes yet to be described.

In use, the sealing ring is placed in the ring groove, and the abutment surfaces are brought together. The sealing leg will be pressed into the ring groove, and the resilience of the material will cause a springback force which will occasion a continuous peripheral line of contact between the sealing leg and the opposed abutment surface 23, thereby forming the seal. The remaining seal is, of course, formed between the bearing leg and the bearing surface 32.

In bending into the position shown in FIG. 1, there is little seal motion at the backing lip, and no void is formed between the ring and the lip. No void exists in the unstressed condition, either. The reentrant lip by backing up the device at this point prevents twisting and irregular deformations along the periphery which could cause wrinkling of the sealing leg, and the sealing leg therefore remains in smooth continuous contact with the opposed abutment surface even though the sealing leg has changed its diameter. Prior art devices have permitted voids to be formed behind the ring, and the material has moved irregularly into the void, thereby causing substantial deformations. The foot, where used, avoids other types of deformations in the ring, especially that of twisting at the internal base of the ring. It gives the ring within the groove a firmer support.

The result of the foregoing construction is a ring which does not wrinkle, twist or distort, and results have shown in testing with the use of mass spectrometers that this structure, when brought up only fingertight, will seal against leakage of helium over a broad range of temperatures from cryogenic to elevated temperatures.

Still a further advantage of this invention is shown in FIG. 5 wherein a wide range of thicknesses of the second body are shown. Such thicknesses are shown by several examples of the dimension T, and it will be observed that the ends of the flare, if they are to clear the inner part of the nut 26, must terminate at or radially within a given level L. Accordingly, the thicker the tube, the shorter is the length of its flare. It will be seen that by maintaining this ring groove at an optimally short axial length S, a wide range of thicknesses of tubing can be accommodated. Persons familiar with standard seals of this general class will recognize the impossibility of obtaining this result with known devices, and with the prior art devices it is therefore necessary to enlarge the entire joint if thicker walled tubings are to be accommodated. This device, by providing the extra mechanical area of backing of the reentrant lip together with its greater retentive properties due to its reentrant direction, enables a smaller ring and a shorter groove to be used and therefore enables a wide range of thickness to be accommodated.

The reversal of the seal ring and the ring groove should the higher pressure be outside the structure is evident. The direction of arrow 31 would be reversed, bearing surfaces 32 and lip 34 would face outwardly instead of inwardly, and the sealing lip would also point in the opposite direction.

The following table of dimensions illustrates suitable dimensions for a 1¼-inch and ¾-inch nominal diameter seal ring. The groove dimensions are complementary. All surfaces are surfaces of revolution around the center line (axis 13).

| | Dimension in inches | | | | | | | |
|---|---|---|---|---|---|---|---|---|
| | A | B | C | D | E | F | $R_1$ | $R_2$ |
| ¼″ | .268 | .210 | .031 | .016 | .238 | .015 | .018 | .003 |
| ¾″ | .764 | .691 | .048 | .033 | .734 | .015 | .023 | .006 |

NOTE.—Material=Teflon, conical angle of abutment surfaces 17 and 23:37°.

This invention thereby provides to the art for the first time a reliable lip seal for sealing even with modest forces of assembly against the leakage of substances which have heretofore been regarded as difficult or impossible to seal against, together with the advantage of enabling wide ranges of wall thicknesses of tubings to be accommodated with but a single ring groove size and structure.

I claim:

1. A structure for making a fluidtight seal between a region of higher and of lower pressure comprising: a pair of bodies having a common axis; an abutment surface on each of said bodies, there being a direction of positive flow along the said surfaces; a ring groove in one of said abutment surfaces, the ring groove including a boundary having a bearing surface facing toward the direction of positive flow, a backing lip surface contiguous to the bearing surface and extending therefrom toward said direction of positive flow and to the intersection with said abutment surface so as to form a reentrant lip extending toward said direction, the tangent to the backing lip surface at said intersection forming an acute angle with the central axis which faces said direction of positive flow, and a relief surface extending between the bearing surface and the abutment surface; a sealing ring in said ring groove comprising a continuous resilient substantially noncompressible body having a sealing leg and a bearing leg, said legs being angularly spaced apart, but deflectible toward one another by forces exerted thereon, the bearing leg having a bearing surface and a backing surface in that order from the central axis, the backing and bearing surfaces having in their free and undistorted condition, a shape which respectively matches and conforms to that of the entire bearing and backing lip surfaces of said groove, the sealing leg projecting beyond the abutment surface of its respective body so as to engage and seal with the abutment surface of the other body when the abutment surfaces are brought together said backing surface of said seal having a shape which matches and conforms to that of the entire backing lip surface of said groove when said abutment surfaces are in engagement with each other, all of said surfaces being surfaces of revolution around said axis; and means holding said bodies together.

2. A structure according to claim 1 in which the generator of the bearing surface is tangent to that of the backing lip surfaces at their intersection.

3. A structure according to claim 1 in which the sealing ring includes a foot projecting from the leg which is closer to the central axis, and bearing against the relief surface as it extends generally toward its respective abutment surface whereby to restrain the end of its respective leg against deformation.

* * * * *